US008822901B2

(12) United States Patent
Budde et al.

(10) Patent No.: US 8,822,901 B2
(45) Date of Patent: Sep. 2, 2014

(54) DEVICE FOR AMBIENT LIGHT COMPENSATION FOR OPTICAL SENSORS EXPOSED TO BOTH USEFUL LIGHT AND AMBIENT LIGHT

(75) Inventors: Wolfram Budde, Dortmund (DE); Wolfgang Büsser, Mandel (DE)

(73) Assignee: ELMOS Semiconductor AG, Dortmund (DE)

( * ) Notice: Subject to any disclaimer, the term of this patent is extended or adjusted under 35 U.S.C. 154(b) by 13 days.

(21) Appl. No.: 13/537,531

(22) Filed: Jun. 29, 2012

(65) Prior Publication Data

US 2013/0015330 A1     Jan. 17, 2013

(30) Foreign Application Priority Data

Jul. 13, 2011   (EP) .................................. 11173802

(51) Int. Cl.
*G01J 1/44* (2006.01)
*G01J 1/32* (2006.01)

(52) U.S. Cl.
USPC .................................................. 250/214 AL

(58) Field of Classification Search
USPC ............. 250/214 AL, 214.1, 214 R; 348/553, 348/602; 340/540, 555; 345/207
See application file for complete search history.

(56) References Cited

U.S. PATENT DOCUMENTS 7,133,079 B2 * 11/2006 Gleim ........................... 348/602
8,242,430 B2 *  8/2012 Dyer ....................... 250/214 AL

FOREIGN PATENT DOCUMENTS

DE      10125307 A1   8/2002
WO        0232114 A1   4/2002
WO     2004027357 A1   4/2004

* cited by examiner

*Primary Examiner* — Seung C Sohn
(74) *Attorney, Agent, or Firm* — Shumaker & Sieffert, P.A.

(57) ABSTRACT

The device for ambient light compensation for use in optical sensors exposed to both useful light and ambient light comprises at least one first photodiode and at least one second photodiode, the at least one first photodiode being adapted to be exposed to substantially the same useful light and ambient light as the at least one second photodiode. The device further comprises a current mirror circuit having an input and an output, the at least one first photodiode being connected to the input of the current mirror circuit, and the at least one second photodiode being connected to the output of the current mirror circuit. The current mirror circuit comprises a lowpass filter connected between the input and the output of the current mirror circuit. The output of the current mirror circuit provides an output signal representing the useful signal compensated for ambient light.

7 Claims, 2 Drawing Sheets

DEVICE FOR AMBIENT LIGHT COMPENSATION FOR OPTICAL SENSORS EXPOSED TO BOTH USEFUL LIGHT AND AMBIENT LIGHT

RELATED CROSS-REFERENCING

The present invention claims the priority of European Patent Application No. 11 173 802.7 filed on Jul. 13, 2011, the disclosure of which is incorporated herein by reference.

BACKGROUND OF THE INVENTION

1. Field of the Invention

The invention relates to a device for ambient light compensation in optical sensors exposed to both useful light and ambient light.

2. Description of the Prior Art

For optical sensors operating with modulated or pulsed useful light, one of the core functions of the application resides in achieving an optimum compensation for the ambient light (assumed to be continuous light). For line-wise and areal arrangements of the sensors, the suitable implementation of the compensation circuit is a special challenge due to the limited surface.

Numerous known methods that have been used heretofore are operative according to the principle represented in FIG. 1.

The current of the photodiode, composed of a signal light portion I_sig and an ambient light portion I_gl, is amplified and, through a suitable filter and compensation circuit, is supplied to a power source (or a resistor) so that only the signal light (I_sig) will remain and the ambient light (I_gl) will be suppressed. Thus, the ambient light may also include alternating components (e.g. from fluorescent lamps) which will also be eliminated by suitable filters.

The above concept suffers from the disadvantage that the ambient light compensation is performed downstream of the signal amplifier so that the signal amplifier and the ambient light compensation cannot be dimensioned anymore independently from each other. By the method of the invention described hereunder, this disadvantage is eliminated.

SUMMARY OF THE INVENTION

In correspondence thereto, the invention proposes a device for ambient light compensation for use in optical sensors exposed to pulsed and respectively modulated useful light and to ambient light, wherein said device comprises
  at least one first photodiode,
  at least one second photodiode,
  said at least one first photodiode being adapted to be exposed to substantially the same useful light and ambient light as said at least one second photodiode, and
  a current mirror circuit having an input and an output, said at least one first photodiode being connected to the input of the current mirror circuit and feeding a photocurrent to said input, and said at least one second photodiode being connected to the output of the current mirror circuit and being fed with current by the current mirror circuit,
  the current mirror circuit comprising a lowpass filter connected between the input and the output of the current mirror circuit, and
  the output of the current mirror circuit providing an output signal representing the useful signal compensated for ambient light.

According to the invention, it is provided that each pixel of a "picture" captured by an optical sensor is represented by use of at least two photodiodes. Thereby, it is advantageously safeguarded that both the first and the second photodiode are simultaneously exposed to the same useful light and the same ambient light. With the aid of a current mirror circuit connected between said two photodiodes and respectively between the two groups of first and second photodiodes, the photocurrent of the first photodiode will be mirrored and this mirrored current will be supplied to the second photodiode. In the process, the ambient light will be suppressed and respectively damped in the current mirror circuit, which is performed with the aid of a lowpass filter. The lowpass filter will allow the signal of the first photodiode representing the useful light to pass in a damped state but will suppress, with good quality and to a sufficient extent, the signal of the first photodiode originating from the ambient light. Thus, at the output, the damped mirrored current signal will be combined with the current signal of the second photodiode, notably in the manner of a subtraction so that, finally, the current signal of the second photodiode representing the useful light will be left over. This signal portion will then be amplified e.g. in a signal amplifier and be further processed in dependence on the respective application.

According to an advantageous embodiment of the invention, it is provided that an integrator is connected downstream of the output of the current mirror circuit between said output and said at least one second photodiode, this integrator being operative to supply an output signal representing the useful signal compensating for ambient light.

It is suitable that said integrator is provided with a switch which will be opened prior to the capturing of useful light performed by the first and second photodiodes and will be closed again after the capturing of useful light.

According to a further advantageous embodiment of the invention, it is provided that the lowpass filter of the current mirror circuit is connected between the gate terminal of a first transistor at the input of the current mirror circuit and the gate terminal of a second transistor at the output of the current mirror circuit.

It is further suitable that the controllable conductive path of the first transistor is connected in series with said at least one first photodiode and that the controllable conductive path of the second transistor is connected in series with said at least one second photodiode.

According to a further advantageous embodiment of the invention, it is provided that a first set of respectively parallel-connected first photodiodes and a second set of likewise respectively parallel-connected second photodiodes are provided and that the first and second photodiodes are arranged alternately adjacent to each other.

According to a further advantageous embodiment of the invention, it is provided that the number of the first photodiodes is in a presettable ratio to the number of the second photodiodes and that the current mirror circuit generates, resulting from this ratio, a compensation ratio from the current at its input relative to the current at its output.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

The essential idea of the invention resides in dividing the optical sensor (e.g. 1:1, while also other division ratios can be envisioned; in case of unequal division ratios, the current mirror circuit (M_GL, M_SIG) should be weighted correspondingly to the division ratio), and to realize the ambient light compensation with the aid of the now existing at least two diodes which in the ideal case are both subjected to the same light conditions. This is accomplished at the penalty of a reduced amplitude of the useful signal, which, however, is tolerated for the benefit of a good ambient light compensation. The basic circuit is shown in FIG. 2.

Figure 3:
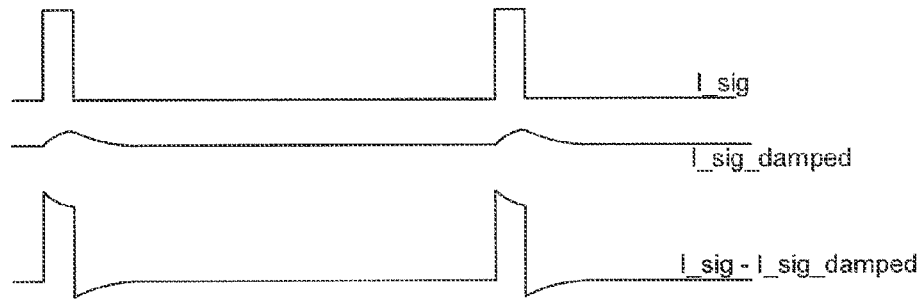
FIG. 3 is a diagram illustrating the typical development of the useful signal, the damped useful signal and the difference therebetween.

FIG. 3 shows a typical development of the clocked useful signal I_sig, the damped signal I_sig_damped, and the difference between them.

Figure 1:
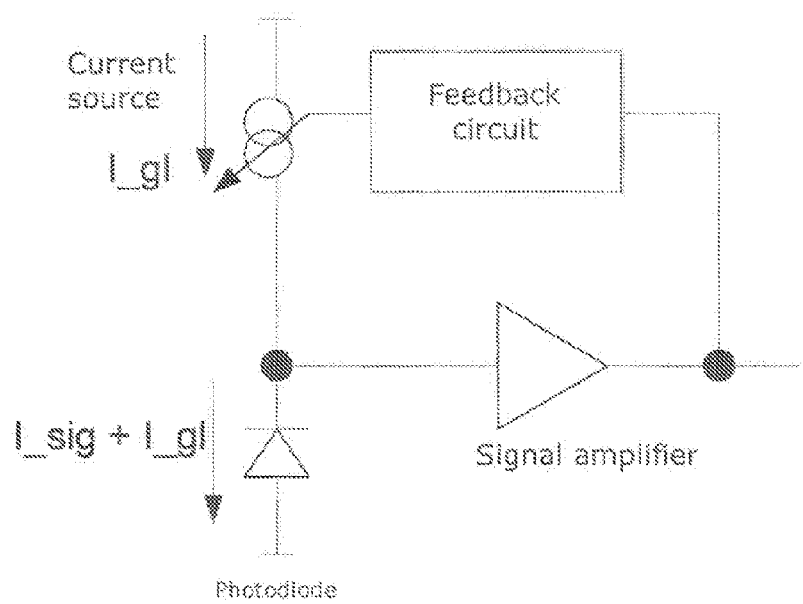
FIG. 1 is a circuit diagram for representation of a known method for ambient light compensation in optical sensors.
Figure 2:
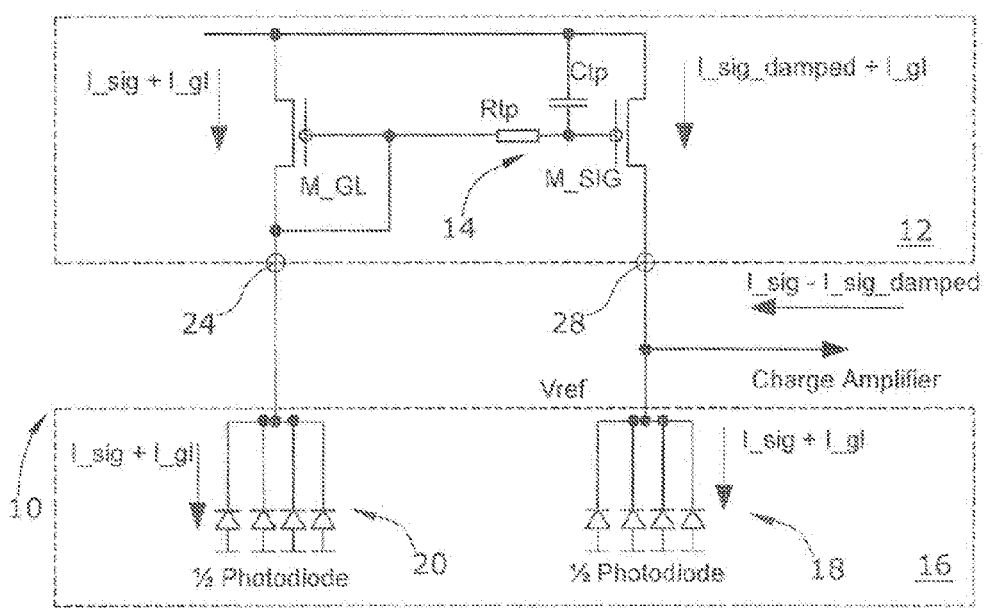
FIG. 2 is a circuit diagram representing for ambient light compensation with a current mirror circuit according to the invention.

The basic element of the circuit 10 according to FIG. 2 is a current mirror circuit 12 comprising a lowpass filter (Rtp, Ctp) 14. Due to said lowpass filter 14, the current mirror circuit will follow the ambient light only to the limiting frequency of the lowpass filter. Although also the signal light (above the limiting frequency) will be damped to a slight extent, a good suppression of the ambient light is of primary importance. In FIG. 2, the optical sensor 16 is represented as comprising a plurality of segments in the form of parallel-connected first photodiodes 18 and parallel-connected second photodiodes 20. Segmentation and interleaving of the segments is recommended so that the signal diodes and respectively first photodiodes 18 (right-hand side in FIG. 2) and the compensation diodes and respectively second photodiodes 20 (left-hand side in FIG. 2) are exposed to the same light conditions.

Instead of a 1:1 division of the photodiode, of course also other divisions can be used (e.g. 1:2, 1:3, . . . ), and the ratio of the photocurrents can then be compensated via the W/L ratio of the transistors M_GL 22 (at the input 24) and M_SIG 26 (at the output 28) of the current mirror circuit 12.

Figure 4:
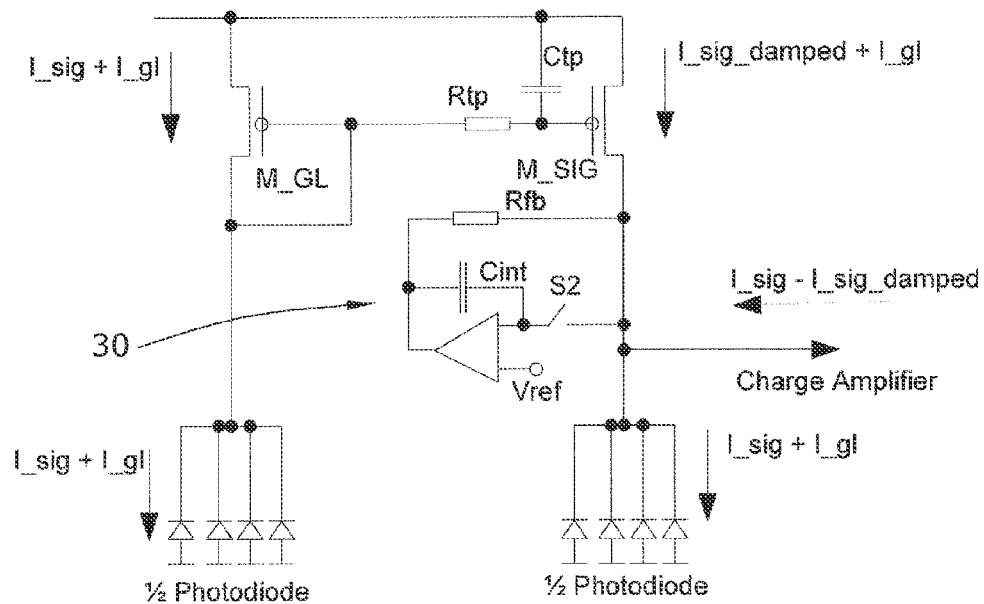
FIG. 4 is a diagram illustrating an example of ambient light compensation with a current mirror circuit and an integrator connected downstream thereof.

A further improvement of the ambient light compensation can be achieved by an additional integrator 30, as shown in FIG. 4.

Figure 5:
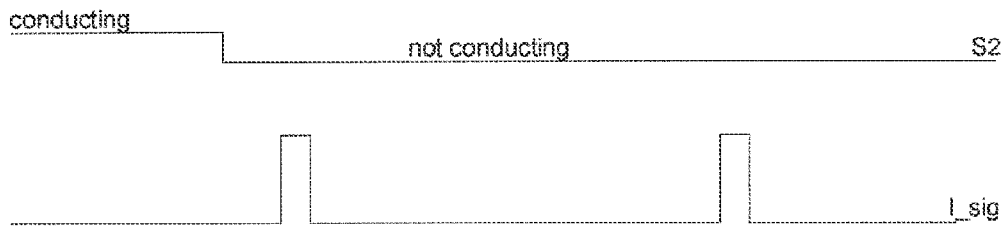
FIG. 5 is a diagram illustrating the temporal development of the opening and closing of a switch of the integrator relative to the useful light.

Said integrator 30 serves to compensate for the residual error of the current mirror circuit 12 (as caused by bad matching or non-uniform light conditions). Further, thereby, the output (to the charge amplifier) of the pixel (composed of at least one first and at least a second photodiode 18,20) will be adjusted to the voltage vref, which will support the amplifier in its process of settling. At the start of the measuring phase, the switch S2 of integrator 30 will be opened. Integrator 30 will store the last value and will not influence the measurement any further. FIG. 5 shows the temporal development of the controlling of switch S2 in relation to the useful light pulses.

It is an advantage of this circuit that the ambient light will be readjusted also still during the measurement phase, while a certain disadvantage consists in the entailed damping of the signal. A complete sampling of the ambient light could eliminate the disadvantage of the signal damping.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A device for effecting an ambient-light-compensated useful signal for use in optical sensors exposed to both useful light and ambient light, said device comprising:
   at least one first photodiode,
   at least one second photodiode,
   said at least one first photodiode being adapted to be exposed to substantially the same useful light and ambient light as said at least one second photodiode, and
   a current mirror circuit having an input and an output, said at least one first photodiode being connected to the input of the current mirror circuit, and said at least one second photodiode being connected to the output of the current mirror circuit,
   the current mirror circuit comprising a lowpass filter connected be-tween the input and the output of the current mirror circuit, and
   the output of the current mirror circuit providing an output signal representing the ambient-light-compensated useful signal.

2. The device of claim 1, wherein an integrator is connected downstream of the output of the current mirror circuit between said output and said at least one second photodiode, said integrator being operative to supply an output signal representing the useful signal compensating for ambient light.

3. The device of claim 2, wherein said integrator is provided with a switch which will be opened prior to the capturing of useful light performed by the first and second photodiodes and will be closed again after the capturing of useful light.

4. The device of claim 1, wherein the lowpass filter of the current mirror circuit is connected between the gate terminal of a first transistor at the input of the current mirror circuit and the gate terminal of a second transistor at the output of the current mirror circuit.

5. The device of claim 4, wherein the controllable conductive path of the first transistor is connected in series with said at least one first photodiode and that the controllable conductive path of the second transistor is connected in series with said at least one second photodiode.

6. The device of claim 1, wherein a first set of respectively parallel-connected first photodiodes and a second set of likewise respectively parallel-connected second photodiodes are provided and that said first and second photodiodes are arranged alternately adjacent to each other.

7. The device of claim 1, wherein the number of the first photodiodes is in a presettable ratio to the number of the second photodiodes and that the current mirror circuit generates, resulting from this ratio, a compensation ratio from the current at its input relative to the current at its output.

* * * * *